United States Patent
Augenstein et al.

(10) Patent No.: US 12,545,787 B2
(45) Date of Patent: Feb. 10, 2026

(54) COLORANT COMPOSITION COMPRISING LEUCOINDIGO FOR COLORING FIBERS AND FABRICS

(71) Applicant: LABORATOIRE BIOSTHETIQUE KOSMETIK GMBH & CO. KG, Pforzheim (DE)

(72) Inventors: Gunther Augenstein, Pforzheim (DE); Christian Ader, Pforzheim (DE)

(73) Assignee: LABORATOIRE BIOSTHETIQUE KOSMETIK GMBH & CO. KG, Pforzheim (DE)

( * ) Notice: Subject to any disclaimer, the term of this patent is extended or adjusted under 35 U.S.C. 154(b) by 0 days.

(21) Appl. No.: 18/836,640

(22) PCT Filed: Feb. 24, 2023

(86) PCT No.: PCT/EP2023/054729
§ 371 (c)(1),
(2) Date: Aug. 7, 2024

(87) PCT Pub. No.: WO2023/161441
PCT Pub. Date: Aug. 31, 2023

(65) Prior Publication Data
US 2025/0154359 A1    May 15, 2025

(30) Foreign Application Priority Data
Feb. 25, 2022 (DE) ............... 10 2022 104 633.8

(51) Int. Cl.
*C09B 67/30* (2006.01)
*D06P 1/22* (2006.01)

(52) U.S. Cl.
CPC .......... *C09B 67/0078* (2013.01); *D06P 1/228* (2013.01)

(58) Field of Classification Search
CPC ........ C09B 67/0078; D06P 1/228; D06P 1/34; D06P 1/65118; D06P 1/6533; D06P 1/67316; D06P 1/6735; A61K 2800/882; A61K 8/19; A61K 8/345; A61K 8/492; A61Q 5/065

USPC ............................................................ 8/550
See application file for complete search history.

(56) References Cited

U.S. PATENT DOCUMENTS

| | | | |
|---|---|---|---|
| 10,655,273 B2 | 5/2020 | Keranen | |
| 2008/0229520 A1* | 9/2008 | Javet | A61K 8/492 8/405 |
| 2020/0370239 A1* | 11/2020 | Keranen | D06P 1/228 |

FOREIGN PATENT DOCUMENTS

| | | | |
|---|---|---|---|
| DE | 19736553 C1 | 12/1998 | |
| DE | 102004014763 A1 | 10/2005 | |
| EP | 0806200 A2 | 11/1997 | |
| FR | 2945745 A1 | 11/2010 | |
| FR | 2945746 A1 | 11/2010 | |
| WO | 1990/015182 A1 | 12/1990 | |
| WO | 1994/023114 A1 | 10/1994 | |
| WO | 2017/223369 A1 | 12/2017 | |
| WO | WO 2019113297 A1 * | 6/2019 | ............ D06P 3/6025 |

OTHER PUBLICATIONS

PCT International Search Report for International Application No. PCT/EP2023/054729, mailed Sep. 22, 2023, 6pp.
PCT Written Opinion for International Application No. PCT/EP2023/054729, mailed Sep. 22, 2023, 10pp.
German Patent and Trademark Office, Search Report for German Patent Application No. 10 2022 104 633,8, dated Apr. 27, 2022, 6pp.

* cited by examiner

*Primary Examiner* — Eisa B Elhilo
(74) *Attorney, Agent, or Firm* — The Roy Gross Law Firm, LLC; Roy D. Gross

(57) ABSTRACT

The invention relates to a colorant composition for coloring fibers and fabrics comprising leucoindigo and at least one organic solvent. To achieve a stable composition, which is broadly applicable to different fibers and fabrics, the water content of the composition is less or equal to 10 wt.-% of the total weight of the composition or the water content of the composition is less or equal to 60 wt.-% of the total weight of the composition and the composition also includes a base.

19 Claims, No Drawings

COLORANT COMPOSITION COMPRISING LEUCOINDIGO FOR COLORING FIBERS AND FABRICS

CROSS REFERENCE TO RELATED APPLICATIONS

This application is a National Phase of PCT Patent Application No. PCT/EP2023/054729 having International filing date of Feb. 24, 2023, which claims the benefit of priority of German Patent Application No. 10 2022 104 633.8, filed Feb. 25, 2022, the contents of which are all incorporated herein by reference in their entirety.

The invention relates to a composition and a method for its preparation used for coloring fibers and fabrics comprising leucoindigo and at least one organic solvent. Further, a colorant mixture comprising said colorant composition, and kits for coloring fibers and fabrics are described.

The coloring of fibers and fabrics including leather, pelts and hair is closely intertwined with the history of mankind. Even today coloring processes play an important role in the latest fashion trends, be it in the production of garments or dyeing of hair as an expression of someone's preferences and personality.

Fibers and fabrics were initially colored using natural colorants until synthetic colorants became more and more broadly available, which were far superior in terms of price, opacity, color intensity and persistence. Consequently, artificial colorants have replaced their natural counterparts to a large extent. However, the ever-increasing health and environmental conscience of the consumers has led to an increased demand for naturally colored products of all kinds. This demand has resulted in an increased effort in research and development in the corresponding industries to tackle the challenges associated with integrating natural colorants into existing processes or develop new strategies altogether.

In particular, with regard to human hair, two main coloring processes, namely oxidative (or permanent) dyeing and direct (or semipermanent) dying, have been established.

The former utilizes one or more oxidation bases combined with one or more couplers and an oxidizing agent. The oxidation bases are commonly selected from ortho- or para-phenylenediamines, ortho- or para-aminophenols or heterocyclic compounds. The oxidation bases are colorless or weakly colored compounds, that penetrate a fiber when dissolved in a suitable carrier substance and form a colored species, that remains within the fiber, by oxidative condensation in combination with the oxidizing constituents the hair color.

The color shade may be varied by combining the oxidation bases with one or more couplers, whereby commonly used couplers are selected from aromatic meta-diamines, meta-aminophenols, meta-diphenols or specific heterocyclic compounds such as indole-based compounds. The plethora of available oxidation bases and couplers allows to essentially create all imaginable colors.

A direct coloring process utilizes so-called direct or substantive dyes exhibiting a pronounced affinity for the respective fiber. Due to the nature of the molecules, in particular their size, direct dyes remain predominantly at the surface of the fiber and hardly penetrate the fiber in contrast to the smaller oxidation bases of the oxidative dyes described above. The main advantage of direct coloring is that an oxidizing agent is not required, which may cause damage to the fiber especially in case of repeated coloring. Furthermore, applied direct colors generally lack the required chemical reactivity to induce the body's defense mechanisms, which reduces the risk of intolerances or other health issues.

One of the first and most known semipermanent hair colorants is henna, a natural colorant obtained from the henna plant. Traditionally, henna has been and is used for dyeing hair, skin, nails as well as letter, silk and wool in particular for festive occasions.

Red henna consists of leaves from shrubs of the genus Lawsonia from the family Lythraceae. Its colorant is 2-hydroxy-1,4-naphtoquinone (sum formula: $C_{10}H_9O_3$) or lawsone (CAS: 83-72-7; CI Natural Orange 6; CI 75420) as shown below.

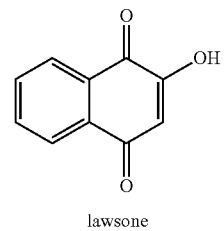 [SMILES: O=C1C=C(O)C(=O)c2ccccc21]

lawsone

This dye leads to an orange-red color on gray hair and a warm, copper to red color on maroon hair. However, the coloring process with henna is inconveniently complex.

A paste is formed from finely ground or powdered leaves with hot water directly before its application. The still warm paste is then applied to the hair. Depending on the texture of the fiber, the dwell time is between fifteen minutes to approximately two hours. The use of special pretreatment agents as well as a heat is also recommended to further intensify the coloration result. The hair is then rinsed, dried and, if necessary, treated with a hair conditioner.

Another well-known, natural colorant is indigo, which is predominantly used to color cloth such as jeans, leather, silk and pool but also hair and nails. Indigo (CAS: 482-89-3) is a compound with the empirical formula $C_{16}H_{10}N_2O_2$ and may be obtained from indican, which is naturally occurring glycoside in different plants such as *Indigofera tinctoria, Polygonium tinctorium, Indigofera suffruticosa* and *Isatis tinctoria*.

The indican-containing plant material is shredded and fermented in warm water. Thereby, the indican is hydrolyzed yielding β-D-glucose and indoxyl. The latter dimerizes to indigo in presence of a mild oxidizing agent such as atmospheric oxygen (see below).

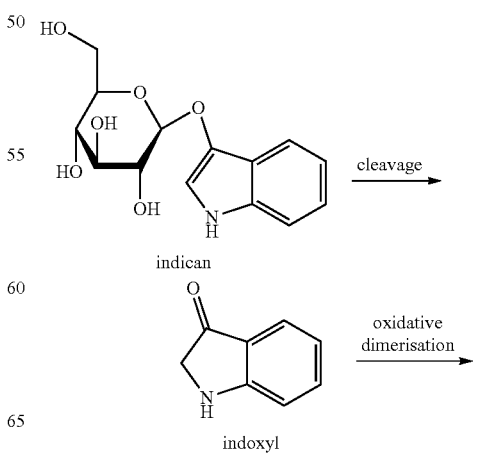

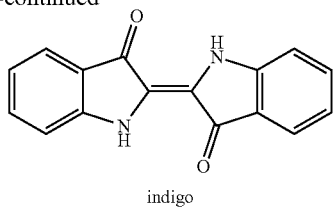

indigo

Since indigo is essentially insoluble in water, direct coloring leads to unsatisfactory results. Therefore, a similar approach as described for henna has been utilized. The finely ground or powdered leaves are mixed with warm water to form paste, which is then applied to the fibers and fabrics.

However, the color intensity is generally poor since the concentration of the indigo precursor indican in the leaves is low and diffusion is limited due to the pasty consistency of the dyeing paste. Consequently, only indican in close proximity to the fiber surface may contribute to the coloration.

Moreover, the resulting coloration is often inhomogeneous since individual fibers may more strongly absorb the colorant than others and/or the absorption capability may vary along the length of the fiber itself.

Due to their natural origin different batches of a natural colorant may vary in their composition leading to variations in the resulting color. For example, the red purple indirubin (see figure below) causes such variations in indigo dyeing processes. Indirubin is formed under similar conditions as indigo in a competing reaction from indican and isatin, an oxidatively formed yellow by-product. To ensure a reproducible color shade on fibers and fabrics the dyer must compensate variations in the composition of the dye with his/her experience and skills.

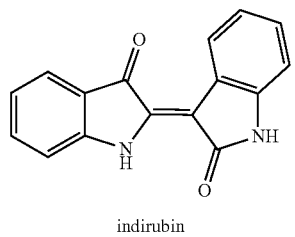 [SMILES: O=C1Nc2ccccc2/C1=C1/Nc2ccccc2C1=O]

indirubin

Since the number of suitable natural colorants is limited, mixtures of different colorants are necessary to achieve the intended shade. Moreover, the opacity of natural colorants is often poor, requiring repeated, time intensive applications to achieve the desired color intensity. In particular, uniform and persistent brown, blue and ashen shades are only accessible to a very limited extent and thus, are often only achieved through said multiple coloring steps.

Whereas shades of brown are in principle accessible from mixtures of henna and indigo dyes in different ratios, natural looking shades may only be achieved on maroon colored hair. On hair of different color, particularly on gray hair, the drawbacks mentioned above mostly lead to unnatural looking results.

Beyond that, the duration of the chemical reactions involved, e.g., in the formation of indigo, results in a strong, observable color shift from a typical yellowish green of the fresh henna/indigo mixture to desired brown shade over the course of days.

To counter this unaesthetic transition period, DE 197 36 553 C1 describes hair colorants comprising a combination of direct colorant and indigo leaves.

Further, EP 0 806 200 A2 relates to non-dusting dyeing agents for keratin fibers employing a suspension of the powdered colorant plant material in an oil, which exhibit improved coloring properties.

In light of the disadvantages associated with the use of natural colorants it was therefore necessary to improve coloring process to obtain a overall better, more reproducible coloration of fibers and fabrics with a higher color intensity while keeping the duration of the process to a minimum.

For textiles synthetic indigo was used rather than its glycosidic precursor indican. Whereas the first synthetic routes were already developed around 1880, the early routes were impracticable until an alternative approach starting from the readily available aniline was invented by the BASF. Consequently, indigo became available on a multi-ton scale.

Due to its insolubility in water, indigo needs to be reduced to the water-soluble leucoindigo or "white indigo" in presence of a base such as sodium hydroxide and a strong reducing agent such as sodium dithionite in a first step (see below).

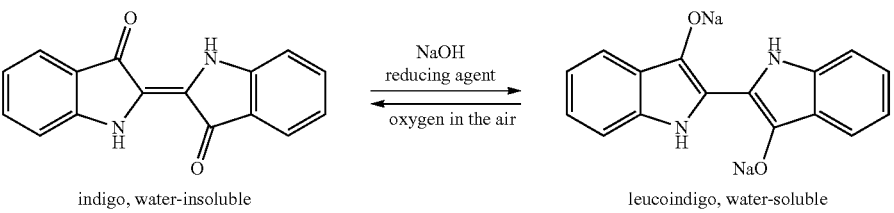

indigo, water-insoluble     leucoindigo, water-soluble

In the subsequent dyeing stage, most commonly used for dyeing cotton, the yarns, fabrics or textiles to be dyed are immersed into the dyeing bath containing the leucoindigo. To achieve uniform dyeing result, a thorough contact with the dye solution must be ensured.

Once the to-be-colored substrate is removed from the dyeing bath, a rapid reoxidation reaction of the leucoindigo with atmospheric oxygen to indigo occurs, generating the typical blue color.

Naturally, the leucoindigo within the dyeing bath is also subject to the reoxidation process. Thus, the surface of a dye solution turns blue upon contact with air, whereby the blue color largely disappears upon stirring. Furthermore, sedimentation of indigo is observed in dyeing baths, whereby the undissolved fraction indigo obviously cannot contribute to the coloration. Furthermore, variations in the concentration of leucoindigo result in undesired deviations from the intended shade and intensity, often outside the demanded color tolerances.

To prevent considerable amounts of leucoindigo from precipitating, an excess of the respective base and reducing agent in the dyeing bath must be ensured at all times. However, said excess leads to highly caustic (pH value >11) and reactive solutions.

At pH values >11.0, leucoindigo is present in its dianionic form (see below). Considering that the functional groups present at the surface of respective substrate, be it a cellulose-based (e.g. cotton) or an amino acid-based fiber (e.g. leather), will also be deprotonated under such conditions, a repulsive interaction between the leucoindigo and the substrate exists due to their likely charges (WO 2017/223369 A1, particularly as described therein on page 4). This repulsive force prevents an optimal coloring result in terms of the amount of dye transferred onto the substrate. Since an increased dwell time does not considerably improve the color intensity, the time-consuming dyeing process must be repeated to achieve the desired result.

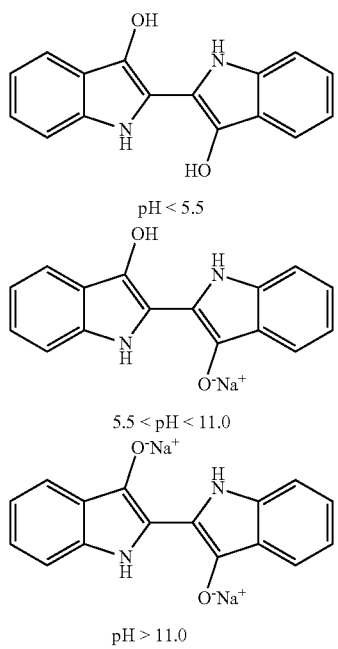

The whole dyeing process as described above entails additional issues. For example, the wastewater contains high amounts of sodium sulfate, which is the coupling product from the reduction of indigo with sodium dithionite, as well as residual sodium dithionite. Being an oxygen-consuming substance, larger amounts of sodium dithionite in the wastewater are ecologically problematic without proper treatment. Additionally, the high saline content of the wastewater hampers an effective recycling, leading to large quantities of wastewater as well as a high demand for freshwater.

To reduce the required amount of reducing agent WO 1994/023114 A1 discloses a method employing pre-reduced indigo. Alternatively, WO 1990/015182 A1 suggests the generation of leucoindigo in an electrochemical process. However, the total expenditures of these processes are high and further require access to the necessary infrastructure, which has largely prevented a commercial success.

WO 2017/223369 A1 and U.S. Pat. No. 10,655,273 B2 describe the application of O,O'- and N,N'-disubstituted indigo derivatives, respectively, whereby the substituents are protective groups to obtain a more manageable form of indigo, which facilitates the dyeing process. In order to release the indigo, the respective O/N-substituents have to be cleaved off during the dyeing process, which in turn leads to co- and by-products with often unknown toxicological properties. Furthermore, additional costs incur due to the required upstream derivatization reactions.

Obviously, the above-described dyeing process for textiles cannot be directly transferred to the coloration of keratin fibers, in particular human hair. Factors such as the temperature, the pH value, the dwell time and the chemical composition are crucial for cosmetic hair treatments and are subject to strict regulations. The combination of extreme pH values and strong reducing agents would cause severe and potentially permanent damage to the hair and scalp.

On the other hand, repeated and lengthy coloring steps to achieve the sought shade and color intensity are hardly accepted by the consumers. This is certainly a decisive reason, why plant-based hair dyes are considered a niche product in comparison to synthetic colorants despite the increased health and environmental awareness.

Therefore, it is the object of the present invention to provide a stable leucoindigo colorant composition, which is broadly applicable to different fibers and fabrics while simultaneously avoiding a repeated and/or lengthy coloring procedure to achieve a satisfactory coloring result.

This object is solved by a (colorant) composition with the features of claim 1. The colorant composition for coloring fibers and fabrics comprises leucoindigo and at least one organic solvent, whereby the water content of the composition is less than 10 wt.-% of the total weight of the composition. Each water content below shows good colorization for a storage time of max four weeks.

The object is further solved by a (colorant) composition with the features of claim 2. The colorant composition for coloring fibers and fabrics comprises leucoindigo at least one organic solvent, wherein the water content of the composition is less or equal to 60 wt.-%, preferably less or equal to 50 wt.-% of the total weight of the composition and the composition comprises at least one base. For long-lasting stability, a water content of 50 wt.-% or below has been identified as the key value.

Preferably, the used base is a strong base. According to the invention, strong bases are defined such that they are completely ionized in aqueous solutions. In addition, a strong base can be characterized by its $pK_b$ value. The $pK_b$ is the negative base-10 logarithm of the base dissociation constant (Kb) of a solution. It is used to determine the strength of a base or alkaline solution. In accordance with the invention, a strong base has preferably a $pK_b \leq 3.75$-.

Surprisingly, these leucoindigo compositions exhibit a decreased sensitivity towards oxidation in contact with atmospheric oxygen, which results in a long-term stable composition suppressing the precipitation of indigo. Furthermore, both compositions allow the stabilization of a fairly high concentration of leucoindigo in the composition, which enhances the composition's coloring properties.

In a preferred embodiment, the at least one organic solvent is selected from a first group of solvents consisting of α,ω-diols. Particularly preferred the α,ω-diols are selected from the group of ethylene glycol, propylene glycol, isopentyldiol, dipropylene glycol and mixtures thereof as these compounds are comparatively well biodegradable and are considered to be rather harmless to humans.

Preferably the at least one organic solvent accounts at least 40 wt.-% of the total weight of respective colorant composition, even more preferably between 50 wt.-% and 90 wt.-%.

In addition or alternatively, an optional second group of solvents is selected from solvents, that are fully miscible with the first group of solvents and at least partially miscible with water, or mixtures thereof.

As previously mentioned, organic solvents belonging to the first group of organic solvents may be used as sole solvent of the colorant composition, i.e., no further organic solvent or the addition of water is required for the formation of leucoindigo from indigo (vatting) during the preparation of the colorant composition. In contrast, the reduction of indigo to leucoindigo is not quantitative in organic solvents belonging to the second group of organic solvents or mixtures thereof. Thus, the second group organic solvents are usually used as co-solvents together with first group organic solvents to improve the overall solubility.

The second group solvent is preferably selected from ethanol, propanol, 1,3-propanediol, glycerin, butylene glycol, hexylene glycol, dimethyl isosorbide, acetamide MEA (acetic acid-2-hydroxyethylamide), ethoxydiglycol and/or mixtures thereof due to the discussed ecological reasons.

In terms of the invention, fully miscible solvents mix in all proportions, i.e., the fully dissolve each other at any concentration by forming a homogeneous mixture (a solution). A pair or multitude liquids, here, e.g., a second group organic solvent and water, is/are considered partially miscible, if there is a set of compositions over which the liquids will form at two-phase liquid system. The two phases contain some fraction of each liquid in each phase. Naturally, the ratio of second group organic solvent(s) to water is chosen such that no phase segregation occurs in the prepared colorant composition.

The broad range of possible solvent mixtures allows to specifically adapt the colorant system to the respective fiber of fabric as well as to further constituents of the colorant composition.

The sensitivity towards oxidation was found to increase with an increasing water content and vice versa. It is believed that this behavior is the result of the decreased solubility of oxygen in the solvent composition. Therefore, the water content should be kept as low as possible. Furthermore, the solubility of oxygen has been observed to decrease in aqueous, alkaline solutions in comparison the corresponding pH neutral solutions. Therefore, the water content of the composition as according to claim 2 is preferably below 30 wt.-%, even more preferably below 10 wt.-%. Particularly preferably the water content is below 1 wt.-% of the total weight of either composition. Colorant compositions to which no water is added are considered as "water-free" in terms of the invention. However, the employed organic solvents may nonetheless comprise a certain amount of water, e.g., due to a solvent's hygroscopic properties. To avoid using expensive pre-dried solvents or tedious drying procedures a water content of between >2 wt.-% and <10 wt.-% of the total weight of leucoindigo compositions are preferred with regard to a cost-benefit assessment. Colorant compositions comprising less than 1 wt.-% will often qualify as water-free compositions in terms of the invention and show convenient storage behavior, which is why the lowest water content is particularly preferred. However, the water content of the composition has to be at least 15 wt.-%, if the total mass ratio of the first to the second group solvent is below 1:10. The water content of the composition may be determined by a standard Karl Fischer titration, if necessary.

It is preferred that the leucoindigo accounts for 0.1 to 30 wt.-% of the total weight of the composition. More preferably the leucoindigo makes up 1.0 to 15 wt.-% of the total weight of the colorant composition, most preferably 1.5 to 6.0 wt.-% to receive a homogeneous colorization. In principle, the amount of leucoindigo in the colorant composition determines the achievable color intensity. Whereas a too low concentration may not achieve the desired color intensity within a single coloration step, highly concentrated compositions may be more prone to the precipitation of re-oxidized indigo.

In another preferred embodiment, the colorant composition comprises at least one base. The presence of a base facilitates the reduction of indigo to leucoindigo. Therefore, any residual base from the preparation of the colorant composition and/or any amount of base added after the preparation will stabilize the leucoindigo in the composition. Moreover, leucoindigo is present in its dianionic form at high pH values, which improves its solubility in the current polar solvents and solvent compositions.

In terms of the invention a strong base is defined as a base having a $pK_B$ value of less than or equal to 4, preferably less than or equal to 2 in water. Even more preferred are inorganic strong bases.

It is particularly preferred that the at least one (strong) base is an alkali metal hydroxide, an alkaline earth metal hydroxide or a mixture thereof. Preferably, the reducing agent is selected from lithium hydroxide, sodium hydroxide, potassium hydroxide, calcium hydroxide or mixtures thereof.

The above-mentioned bases have the general advantage of being cheap and readily available. Naturally, other bases which are soluble in the solvents and solvent mixtures as outlined above may be utilized. It is noted, that the respective counterion may also be the counterion of the leucoindigo in the colorant composition. Therefore, special care should be taken when selecting the at least one base to avoid the formation of insoluble leucoindigo salts.

In a particularly preferred embodiment, the at least one (strong) base accounts for 0.01 to 20 wt.-%, preferably for 0.1 to 10 wt.-%, particularly preferred for 0.5 to 5.0 wt.-%, of the total weight of the composition.

Whereas high amounts of a base assure a constant high pH value and therefore a constant coloring performance of the colorant composition, a lower amount of base, in particular below 5 wt.-%, is preferred for cosmetic applications to avoid potential damage to the skin and/or hair fibers.

In another preferred embodiment, the composition comprises additionally or alternatively at least one further reducing agent. Whereas the reducing agent is in principle only required for the initial preparation of the colorant composition, i.e., the reduction of indigo to soluble leucoindigo, it was found that any residual reducing agent from the preparation and/or any amount of reducing agent added after the reduction reaction will stabilize the leucoindigo in the colorant composition. Thereby, the reducing agent may "re-reduce" any indigo formed by the unwanted oxidation of leucoindigo when in contact with atmospheric oxygen or another oxidant.

The at least one reducing agent is preferably ascorbic acid, erythorbic acid, hydroxyacetone, sodium dithionite, sodium sulfide, sodium metabisulfite, sodium borohydride, sodium thiosulfate, a reducing sugar or a mixture thereof. These reducing agents have the advantage of being cheap and readily available. Furthermore, the solubility was found to be suitably high for the solvents and solvent mixtures described above.

It is particularly preferred if the reducing sugar is selected from fructose, glucose, galactose, maltose, galactose or a mixture thereof. Naturally, larger reducing sugars may also be employed. In addition to their high solubility, reducing sugars readily reduce indigo to leucoindigo. Moreover, reducing sugars pose no health risk and the co-products formed in the redox reactions are harmless to the environment.

It is further preferred, that the at least one reducing agent accounts for 0.1 to 20 wt.-%, preferably 1.0 to 15 wt.-%, particularly preferably 1.5 to 8.0 wt.-%, of the total weight of the colorant composition. Thereby, a premature oxidation of the leucoindigo as outlined above is effectively prevented and the long-term stability of the colorant composition ensured.

In a further embodiment, the composition is a solution, cream, and foam, or a gel. This facilitates its application in the dyeing process, since the composition's consistency may be adapted to the respective substrate.

The composition may further comprise additional constituents such as cationic, anionic, zwitterionic or nonionic surfactants as well as combinations thereof, acids, bases, buffers, chelating agents, dispersing agents, foaming agents, inorganic salts, stabilizing agents, thickening agents, viscosity modifiers or combinations thereof. Each of the aforementioned constituents may account for 0.1 wt.-% to 30 wt.-% of the total weight of the composition.

It is preferred if the organic acid is selected from malic acid, lactic acid, mandelic acid, gluconic acid, glycolic acid or a mixture thereof wherein the presence of an alpha-hydroxy acid is particularly preferred. In addition to stabilizing the leucoindigo comprised in the colorant composition as a reducing agent, fruit acids are known constituents of cosmetic preparations used for improving skin texture, thus beneficially affecting the scalp upon application of the ready to use colorant. Preferably, the buffer is selected from glycine, TRIS-glycine or TRIS to stabilize the pH value of composition. Considering that the protonation state of leucoindigo depends on the pH value, the dominant species in solution and thus, its solubility and further chemical properties may be adapted to the respective composition. It is further preferred, that the at least one buffer accounts for 0.1 to 25 wt.-%, preferably from 0.5 to 15 wt.-%, particularly preferably from 1.0 to 5.0 wt.-% of the total weight of the colorant composition.

The viscosity of a water-free composition may be increased by addition of pyrogenic silicon dioxide, which is available under the trade name "Aerosil" from the manufacturer Evonik, or a thickener under the trade name "Creagel Crystal" from Cosmetics Innovations and Technologies SARL.

The invention further relates to a method for the preparation of the colorant composition comprising the steps
a) addition of at least one (strong) base to a suspension of indigo in at least one organic solvent as well as addition of at least one reducing agent, and
b) heating of the mixture of suspension of indigo) until the vatting is complete.

Regarding step a), all variations of the process are possible. In particular, this application comprises
i. the addition of at least one (strong) base to a suspension of indigo in at least one organic solvent into a first step and the addition of at least one reducing agent in a second step,
ii. simultaneously the addition of at least one (strong) base and the addition of at least one reducing agent to a suspension of indigo in at least one organic solvent and
iii. the addition of at least one reducing agent to a suspension of indigo in at least one organic solvent into a first step and the addition of at least one (strong) base in a second step, Explicitly should also clarify that letters a) and b) do not indicate an order. It is rather possible that the suspension of indigo is heated before, during and/or after the addition.

Thereby, the at least one (strong) base, the at least one reducing agent and the at least one organic solvent are selected from the bases, reducing agents and organic solvents as outlined above, respectively. The indigo may be of natural and/or artificial origin.

Preferably, the individual reactants and solvents used in the method as well as their water content are selected such that the composition obtained from step b) already features the desired water content of <60 wt.-% and at least one strong base or a water content of <10 wt.-% of the total weight of the composition, respectively, and consequently, does not require any further work-up steps, e.g., drying with desiccants. Thus, the preparation process stays as simple as possible and obtained composition may be directly filled into suitable containers, in particular air-tight containers such as tubes, bottles, cans or jars, for storage.

The advantage over known leucoindigo dyeing compositions and their preparation methods is that the improved storage stability no longer requires preparation of the leucoindigo immediately before application. Consequently, variations in the process parameters and quality of the (natural) starting materials may be minimized, which allows more reproducible coloration results between different batches. Naturally, a consistent coloration result is still a key criterion for customers wishing to use a natural and less harmful hair dye. Moreover, the significantly reduced water content of the colorant composition results in a reduced amount of wastewater considering that purification of the at least one organic solvent is readily possible, a fact which is of particular interest for fabric dyeing industry. Similar to aqueous solvent systems, indigo is hardly soluble in the organic solvent or solvent mixtures as according to the invention. Therefore, the indigo is reduced to leucoindigo in the process called vatting. The process takes place upon heating a suspension of indigo in presence of a base and a reducing agent. The vatting is accompanied by a color change from blue to yellowish-brown, which indicates the formation of leucoindigo. The vatting is complete once the indigo has been reduced and consequently dissolved. In dependency of the solvent system and in particular of the water content a minor amount of indigo may remain as sediment nonetheless, which may be removed by filtration. This process usually takes around 10 minutes to 2 hours.

Preferably, the at least one (strong) base is added to the suspension is an aqueous solution in step a). In a dissolved state, the base is readily available to facilitate the reduction of indigo, which accelerates the reaction.

In a further embodiment, the amount of base is chosen such that the resulting pH value is between 9 and 12.5.

Preferably, the amount of base is used in an up to three-fold stoichiometric excess of indigo. Thereby, suitable conditions for the vatting are provided.

It is preferable, to add water to the suspension of step a). Thereby, the water content of the to-be-formed colorant composition is adjusted to the desired level, which is particularly important when only using a second group organic solvent. Furthermore, the solubility of the optional additives may be improved by the addition of water. However, care must be taken that the resulting water content does not lead to compositions with the water content of more than 60 wt.-%, preferably no more than 50 wt.-% of the composition due to the increased oxygen sensitivity.

The vatting is preferably conducted at temperatures between 50 and 110° C., particularly preferably between 70 and 90° C., in step b). The reduction of indigo was found to be strongly dependent on the reaction temperature. Whereas no or hardly any conversion is observed at room temperature, convenient rates are achieved at temperatures exceeding 50° C. Reaction temperatures above 110° C. lead to undesirably high evaporation of the respective solvents and should thus be avoided. Moreover, certain further additives may be prone to degradation at elevated temperatures. Best results are achieved between 70 and 90° C.

The invention further relates to the mixture for coloring fibers and fabrics comprising the composition as described previously as a first constituent and at least one further composition as a second constituent whereby the second constituent is an aqueous composition.

Whereas the colorant composition (first constituent) may directly be used for dyeing fibers and fabrics, it was found that the coloration result is impeded by an excessive proportion of organic solvents. Therefore, the colorant composition, which may be considered as a concentrate, is diluted with an aqueous composition (second constituent) to improve the coloration result. Considering that the first constituent comprises a high amount of leucoindigo, an intense coloration of the respective fibers of fabrics is thereby achieved. In terms of the invention, an aqueous composition comprises predominantly water.

Preferably, the water content of the second constituent is at least 50 wt.-%, particularly preferably at least 75 wt.-% of the total weight of the second constituent. A high water-content ensures the desired dilution of the colorant composition at a minimum required volume, leading to a highly concentrated colorant mixture with an optimal composition.

It is preferred, that the mixture comprises the first and second constituent in a mass ratio ranging from 1:2 to 1:8, preferably from 1:3 to 1:7. In particular, a ratio of 1:5 has been found to be broadly applicable. The resulting shade is defined by the dilution of the colorant composition. As already outlined previously, the coloration improves with a decreasing proportion of organic solvent(s). Naturally, strongly diluted mixtures cannot achieve an intense and vibrant coloration of the respective fiber or fabric due to a lack of sufficient colorant. Therefore, a middle way between organic solvent content and leucoindigo concentration is required.

In a preferred embodiment, the second constituent comprises at least one organic acid, inorganic acid and/or buffer. This allows the adjustment of the pH value of the resulting mixture. In particular with respect to cosmetic application, a lower pH spares the hair fibers and scalp. Moreover, it could be shown that the coloration of the mixture is improved at lower pH values in comparison to a standard caustic mixture. This effect is presumably caused by the formation of the monoanionic and/or neutral form of leucoindigo at lower pH values as well as the increasing protonation of any functional groups present on the fiber or fabric surface. Thus, the repulsive ionic interactions between the leucoindigo and the surface due to likely (negative) charges at high pH values are decreased, which facilitates the deposition of colorant.

A buffer solution is an aqueous solution consisting of a mixture of the weak acid and its conjugate base, or vice versa. A buffered solution hardly changes its pH value upon addition of certain amounts of (strong) acids or bases. Buffer solutions are generally used as means for keeping the pH value as constant as possible in a broad variety of chemical applications.

It is preferred, that the concentration of the at least one organic acid, inorganic acid and/or buffer ranges from 0.1 to 25 wt.-%, preferably from 0.5 to 15 wt.-%, particularly preferably from 1.0 to 5.0 wt.-%, of the total weight of the second constituent. For combinations acid(s) and/or buffer (s) the above-defined ranges also apply, i.e., the total amount should not fall below or exceed the respective range.

In a further embodiment, the at least one organic acid is selected from citric acid, formic acid, acetic acid, tartaric acid, adipic acid, succinic acid, malic acid, maleic acid, fumaric acid or mixtures thereof, the at least one inorganic acid is selected from phosphorus acid, phosphoric acid, hydrochloric acid, sulfuric acid, sulfurous acid or mixtures thereof and/or the at least one buffer is selected from acetate buffer, phosphate buffer, phosphate-citrate buffer, citrate buffer, glycine buffer, TRIS-glycine buffer, TRIS buffer and/or bicarbonate buffer.

These acids and buffers are reasonably priced and readily available. Moreover, none of the above-mentioned acids poses a health risk at moderate levels, which renders them suitable for cosmetic applications. This applies in particular to the organic acids and buffers.

Preferably the resulting pH value of the mixture is between 2.0 and 12.5, more preferably between 2.0 and 9.0, particularly preferably between 2.5 and 6.5. A pH value between 2.0 and 9.0 is especially suited for cosmetic applications, whereas other fibers and fabrics may also be dyed under more acidic or caustic conditions. The pH value of the individual constituents or the resulting mixture can be measured by using a pH meter or simply estimated with aid of indicator paper.

The viscosity of the second component can be increased by adding thickening agents such as cellulose ethers, xanthan gum and/or polyacrylates, which are generally applied in cosmetic or industrial formulations. Moreover, the second constituent may comprise a carrier, such as benzyl alcohol, in the concentration of 0.1 to 7.5 wt.-%, preferably 0.2 to 5.0 wt.-% of the total weight of the second constituent.

The mixture may comprise a third constituent, wherein the third constituent comprises at least one further colorant compound. Obviously, a colorant mixture comprising leucoindigo as sole colorant (or color precursor) will only achieve shades of blue. By addition of at least one further colorant or its precursor the corresponding mixed colors become available.

In a preferred embodiment, the at least one further colorant is selected from henna (active principle lawsone), campeche wood extract, redwood extract, myrobalan plum extract, quercetin and/or 3,4,5-trihydroxybenzoic acid (gallic acid). In another preferred embodiment anthocyanine based dyes e.g. blackcurrant, blackberries or red cabbage may be used. These colorants are all of natural origin and may be used in cosmetic applications depending on local regulations. Of all those the combination of indigo and henna is of particular interest, since a wide range of natural looking, intense red brown to deep brown/ashen shades are achieved (vide infra).

Preferably the organic solvent or solvent mixture and/or water content of the third constituent is/are the same as that of the first constituent. Thereby, an optimal miscibility is ensured, and the coloring performance of the resulting mixture is not impaired due to inhomogeneities.

Moreover, any of the additives named for the first constituent such as reducing agents, bases or surfactants, may be also used in the third constituent.

In a preferred embodiment the mass ratio of the first constituent to the third constituent ranges from 20:1 and 1:20, preferably from 20:1 to 1:10. Thereby, the obtained shade can be varied. For example, at high leucoindigo to lawsone ratio leads to dark brown colors, whereas a low ratio will result in lighter reddish-brown colors.

It is preferred that the mass ratio of the total amount of the first and third constituent to the second constituent ranges from 1:2 to 1:8, preferably from 1:3 to 1:7, particularly preferably 1:5. As mentioned above, a too high proportion of organic solvents in the colorant mixture does not achieve optimal coloration results. Therefore, similar ratios as for the two-constituent colorant mixture apply also for the three-constituent colorant mixture.

Optionally the colorant mixture may comprise color intensifiers such as metal salts e.g. iron sulfate, zinc sulfate or copper sulfate to further enhance the color intensity.

In a further embodiment, the mixture is a solution, cream, and foam, or a gel. This facilitates its application in the dyeing process, since the mixture's consistency may be adapted to the respective substrate.

In a preferred embodiment, the mixture comprising leucoindigo is a cream. The storage stability of such a cream-base is equivalent to that of a conventional hair coloring cream. Particularly useful are cream compositions, that are able to stabilize a high salt load. Cream compositions based on a combination of fatty alcohols and phosphate esters are especially useful in this aspect.

The fatty alcohols are preferably selected from $C_8$ to $C_{30}$ fatty alcohols, particularly preferably from cetyl alcohol, stearyl alcohol or combinations thereof.

Among the phosphate esters phosphoric acid mono esters, wherein the ester is an alkoxylated $C_1$ to $C_{22}$ fatty alcohol with 1 to 50 ethoxylate units, phosphoric acid diesters, wherein the esters are selected independently of each other from $C_1$ to $C_{22}$ fatty alcohols. For example, compositions comprising oleth-5 phosphate and dioleyl phosphate are commercially available under the trade name Crodafos™ HCE or compositions comprising cetyl alcohol, stearyl alcohol, dicetyl phosphate and ceteth-10-phosphate (INCI names) under the trade name Crodafos™ CES.

All constituents of the mixture may individually comprise further additives such as EDTA, EDDS and/or their salts as sequestering agent, and/or the preserving agents including phenoxyethanol, which is available as a mixture with ethyl hexyl glycerin under the trade name Euxyl® PE 9010 from the Schülke und Mayr GmbH, p-hydroxybenzoic acid and/or its methyl and ethyl esters, ammonium benzoate, ammonium propionate, benzyl alcohol, chlorhexidine and/or formic acid and its salts.

To improve the combability of the dyed fibers, in particular with regard to cosmetic applications, the mixture and/or its individual constituents preferably comprise one or more cationic polymers, in particular selected from the class of compounds termed Polyquarternium (INCI name) including Polyquarternium-6, Polyquarternium-7, Polyquarternium-10, Polyquarternium-22 and/or Polyquarternium-39, or cationic emulsifying agents of the alkyl-($C_{16}$, $C_{18}$, $C_{22}$)-trimethylammonium type, including cetrimonium chloride, behentrimonium chloride or methosulfate and soytrimonium chloride.

The invention further relates to a kit for coloring fibers and fabrics comprising the leucoindigo based composition as first constituent as outlined above and the above-described aqueous composition as second constituent, whereby the first constituent is stored in a first container and the second constituent is stored in a second container.

In a preferred embodiment of this kit, the second constituent contains at least one compound to lower the pH value of the overall mixture of all constituents. So, conditions during colorization are less harsh and, consequently, the fibers to be dyed are less damaged. If hair is colored, a pH value of 9 or less, preferably 7 or less, most preferably between 3 and 8 is particularly favorable. In most cases, the second const contains an acid.

The separate storage of the two constituents in two containers maximizes the long-term stability of the leucoindigo comprising composition, since its water content kept at a minimum until use and thus, the lowest possible oxidation sensitivity is ensured, in particular for water-free formulations.

The respective containers may be any container suitable for storing the constituents over extended periods of time without affecting their functionality, including but not limited to tubes, bottles, vials, bags, cartridges, and pouches of different materials such as metals including aluminum, plastics and/or coated paper.

In a preferred embodiment the kit further comprises means to dose the individual constituents in the desired ratio and/or means for mixing the constituents thoroughly. Thereby, the colorant mixture achieving the desired shade may conveniently be prepared directly before its application.

For mixtures comprising three constituents, the third constituent is preferably stored in a third container separately from the first and second constituent or stored in the first container as a mixture with the first constituent.

The first alternative has the advantage, that any (degradation) reactions between incompatible substances contained in different constituents are effectively prevented, thus improving the shelf life of the colorant mixture and its individual constituents, respectively. Beyond that, the user of the colorant may freely decide the ratio between the leucoindigo and the at least one further colorant such that different shades may be achieved.

The second alternative facilitates the colorant's application, since only two components are to be mixed to prepare the ready-to-use colorant mixture. Moreover, at two-container kit is less complex and therefore cheaper in the production.

The invention further relates to the use of the leucoindigo based composition or a mixture comprising the leucoindigo based composition (first constituent) and at least one further aqueous composition as second constituent as described above for coloring fibers and fabrics.

It is preferred that the fibers and fabrics are natural or artificial fibers and fabrics, preferably protein-, cellulose or petrochemical-based fibers and fabrics, particularly preferably keratin fibers, kapok, hemp, bamboo, flax, cotton, sisal, jute, kenaf, ramie, lyocell, soy or coconut, nylon, polyester, acrylic, spandex, olefin, synthetic fur and leather, neoprene, microfiber or acetate fibers and fabrics made thereof, silk, wool, leather or feathers.

Preferably, the leucoindigo based composition or colorant mixture is applied to the respective fiber or fabric directly after its preparation, i.e., when the vatting process is finished and the obtained leucoindigo based composition has reached the required temperature or after the mixture has been prepared by mixing its at least two constituents. This ensures the most intense coloration, because the maximum amount of colorant is available directly after the preparation.

The conditions of the dyeing process, e.g. temperature, duration, pre- and/or post-treatment, may be adjusted to the respective fiber or fabric and desired coloration result. In principle, the colorant composition or mixture may simply be used in established dyeing processes without requiring complex adaptations of the equipment and/or the process parameters.

Further objectives, features, advantages and possible applications of the invention can also be taken from the description of the following examples. All features described form the subject matter of the invention per se or in any combination, independent of their inclusion in the claims or their back references.

EXAMPLES

All color measurements on the substrates were performed with the Konica-Minolta Chromameter CM 3700 D in accordance with the European standard EN ISO 11664-4 "Colorimetry—Part 4: CIE 1976 L*a*b* Color space".

The L*a*b* color space or CIELAB describes all perceptible colors. It uses a three-dimensional color space, in which the lightness value L* defines black at 0 and white at 100 with its axis is perpendicular to the color plane (a*, b*). The a*axis represents the green-red opponent colors, with negative values toward green and positive values toward red. The b* axis represents the blue-yellow opponents, with negative numbers toward blue and positive toward yellow.

Color changes in the color of a substrate are usually expressed in ΔE values, that are calculated according to the well-known formula $$\Delta E = \left[ (L_1 - L_0)^2 + (a_1 - a_0)^2 + (b_1 - b_0)^2 \right]^{1/2}$$

wherein the indices 0 and 1 stand for the values before and after the treatment, respectively.

The designation "jeans blue" is based on the measurement results of five cotton tissues died with indigo. The obtained L*a*b* values were in the range of L*=25 to 60, a*=−5 to 0 and b*=−10 to −17.

If not mentioned otherwise, the dwell time for the individual substrates in the respective colorant composition is thirty minutes and is conducted at room temperature (r.t.). The respective sample is then rinsed with water until the excess of colorant is removed, dried and subjected to the CIELAB measurement.

The abbreviation "a.t." or "r.t." means ambient temperature or room temperature, respectively.

Example 1: Preparation of a Leucoindigo Vat with Sodium Dithionite and Coloring of Yak Hair (State of the Art)

Commercially available plant-based hair colorants are only sold as a herbal powder and meant to be applied as a paste rather than a solution, cream or gel, since this would require the stabilization of the soluble leucoindigo. Thus, an indigo colorant composition normally applied solely to textiles is used for a better comparison.

An aqueous sodium hydroxide solution (3 wt.-%, 50 mL) is added to water (300 mL) and heated to 70° C. in a water bath. Synthetic indigo powder (1 g) is suspended in a mixture of ethanol (96%, 10 mL) with an aqueous sodium hydroxide solution (3 wt.-%, 50 mL) and added to the heated diluted sodium hydroxide solution. After the addition of sodium dithionite (10 g), the reaction mixture is stirred for another 30 minutes at 70° C. before being allowed to cool to room temperature. A color change to yellow is observed over the course of the reaction, indicating the formation of leucoindigo. Moreover, the blueish skin is formed on the surface of the reaction solution.

The samples of the obtained solution are then filled into a glass container with a PE screw cap (sample "glass") or airtight aluminum tubes ("Al1" and "Al2") and stored for a defined period at defined temperature to determine the long-term stability by visual assessment and measurement of the resulting CIELAB values of yak strands colored therewith. The results are summarized in table 1. The term "Ref." denotes the untreated yak hair used as reference.

TABLE 1

Results - long term stability of prior art colorant.

| Sample | T | t in weeks | L* | a* | b* | ΔE | Stability |
|---|---|---|---|---|---|---|---|
| Ref. |  |  | 81.27 | −0.59 | 12.94 | — | — |
| fresh | r.t. | 0 | 18.81 | 3.58 | −12.75 | 67.53 | — |
| glass | r.t. | 1 | 44.10 | −4.59 | −16.38 | 26.82* | Instable |
| Al1 | r.t. | 4 | 29.71 | −1.28 | −17.84 | 12.97* | Instable |
| Al2 | 40° C. | 4 | 36.85 | −5.16 | −16.14 | 20.33* | Instable |

*With reference to sample "fresh"

The coloration of yak hair in presence of sodium dithionite is possible at high pH values right after the preparation (sample "fresh"), the dyeing vat is not stable under the respective conditions as provided in table 1 above. This is indicated by the large ΔE values, implying a pronounced variation of the shade obtained when using the aged dyeing vat for coloration of yak hair. Moreover, the highly caustic solution excludes an application of the dyeing vat for cosmetic purposes.

Example 2: Preparation of a Leucoindigo Vat in Water Free Organic Solvents

A solution of sodium hydroxide (1.68 g, 42 mmol) in propylene glycol (15.12 g) and a solution of fructose (5.16 g, 28.64 mmol) in propylene glycol (46.44 g) are sequentially added to the stirred suspension of synthetic indigo (5.0 g, 19.06 mmol) in propylene glycol (26.6 g) to create sample 2a. The mixture is heated to 80° C. and stirred for another thirty minutes. After cooling to room temperature, the obtained yellowish-brown solution is filled into airtight containers for storage.

Samples 2b (ethylene glycol), 2c (hexylene glycol), 2d (isopentyldiol) and 2e (dipropylene glycol) are prepared in an analogous manner.

Comparative sample 2f is also prepared in analogous manner to sample 2a. However, aqueous solutions of sodium hydroxide and fructose are used, resulting in a water content of approximately 67 wt.-% of the total weight of the composition.

TABLE 2

Results - long term stability of samples 2a to 2f.

| Sample | T | t in weeks | L* | a* | b* | ΔE | Stability | Brilliance* |
|---|---|---|---|---|---|---|---|---|
| Ref. | | | 81.27 | −0.59 | 12.94 | — | — | Brilliant |
| 2a | a.t. | 0 | 32.20 | −2.36 | −15.27 | — | — | Brilliant |
| | 40° C. | 12 | 30.80 | −1.76 | −15.30 | 1.50 | Stable | Brilliant |
| 2b | a.t. | 0 | 20.15 | −2.12 | −12.96 | — | — | Brilliant |
| | 40° C. | 12 | 27.20 | −0.78 | −13.03 | 7.17 | Sufficiently stable | Brilliant |
| 2c | a.t. | 0 | 33.93 | −0.77 | −16.93 | — | — | Brilliant |
| | 40° C. | 12 | 36.52 | −0.74 | −14.52 | 2.67 | Stable | Brilliant |
| 2d | a.t. | 0 | 34.99 | −0.27 | −13.88 | — | — | Brilliant |
| | 40° C. | 12 | 37.71 | −0.84 | −14.02 | 2.78 | Stable | Brilliant |
| 2e | a.t. | 0 | 33.46 | −0.74 | −13.94 | — | — | Brilliant |
| | 40° C. | 12 | 35.80 | −2.19 | −13.80 | 2.75 | | Brilliant |
| 2f | a.t. | 0 | 36.9 | −1.91 | −13.65 | — | — | Matte |
| | 40° C. | 4 | 39.811 | −2.87 | −10.5 | 4.27 | Sufficiently stable | Matte |
| | 40° C. | 12 | 58.3 | 0.54 | 2.64 | 26.9 | unstable | n.a. |

The results clearly show that the inventive leucoindigo colorant compositions 2a to 2e achieve excellent coloring results even after extended storage periods at elevated temperatures. For indigo colorants the evaluation of the colorant's stability is predominantly determined by parameter b*, since the b* axis represents the blue-yellow opponents.

In contrast, the vatting is incomplete for comparative sample 2f, which resulted in a correspondingly high amount of precipitated indigo and less brilliant shades, (optically visible to the evaluation panel). This suggests a deposit of insolubilized indigo on the strands. The twelve weeks old dyeing vat does not color the yak hair any more, but only leads to a soiling of the strands. Therefore, an increased water content leads to instability,

Example 3: Attempted Preparation of a Leucoindigo Dyeing Vat with 1,3-Propanediol Finely powdered sodium hydroxide (0.17 g, 4.2 mmol) and a 10% solution of fructose in 1,3-propanediol (2.9 mmol, 5.16 g) are sequentially added to a stirred suspension of synthetic indigo powder (0.5 g, 1.91 mmol) in 1,3-propanediol (2.7 g). The mixture is then heated to a temperature of 100° C.

In contrast to example 2, no usable dyeing vat is obtained even after 60 minutes of stirring at 100° C., which shows, that an organic solvent of the second group solvent requires the presence of a first group organic solvent and/or water.

Example 4: Attempted Preparation of a Leucoindigo Dyeing Vat with Glycerol

Finely powdered sodium hydroxide (0.17 g, 4.2 mmol) and a 10% solution of fructose in glycerol (2.9 mmol, 5.16 g) are added sequentially to a stirred suspension of synthetic indigo powder (0.5 g, 1.91 mmol) in glycerol (2.7 g). The mixture is heated to a temperature of 100° C.

In contrast to example 2, no usable dyeing vat is obtained even after 60 minutes of stirring at 100° C.

Example 5: Preparation of a Leucoindigo Dyeing Vat with an Organic-Aqueous Solvent Mixture A 30% solution of sodium hydroxide in water (45 mmol, 6.0 g) and fructose (7.0 g, 38.85 mmol) are sequentially added to the stirred suspension of synthetic indigo powder (3.5 g, 13.35 mmol) in glycerol (60 g) and water (23.5 g). The obtained mixture is heated to 80° C. and stirred for another 30 minutes. After cooling to room temperature, the obtained yellowish-brown solution is filled into airtight containers for storage. The dye-out after 4 weeks stored at 40° C. showed complete discoloration on the dyed yak strands:

TABLE 3

Results - long term stability of example 5

| Sample | T | t in weeks | L* | a* | b* | ΔE | Stability |
|---|---|---|---|---|---|---|---|
| Ref. | | | 81.27 | −0.59 | 12.94 | — | — |
| 5 | a.t. | 0 | 37.54 | −2.16 | −13.16 | — | — |
| | 40° C. | 4 | 62.30 | 6.64 | −18.55 | 31.71 | unstable |

A comparison of examples 4 and 5 shows that the addition of water to second group solvents such as glycerol is necessary to obtain a usable leucoindigo dyeing vat resulting in a higher solubility of the lecuoindigo in the vat solution. However, adding water brings in the disadvantage of entrapped oxygen thus resulting in poor longterm stability. Group 2 solvents such as glycerin cannot be used without group 1 solvents in combination with water.

Example 6a: Preparation of a Leucoindigo Dyeing Vat Using Natural Indigo with a Propylene Glycol/Water Mixture A 10% solution of sodium hydroxide in water (48.25 mmol, 19.3 g), fructose (5.1 g, 28.31 mmol) and sodium dithionite (1.67 g, 9.59 mmol) are sequentially added to the stirred suspension of natural indigo (indigo content: 54%, ash content: 6.3%, 5.0 g, 10.29 mmol) in propylene glycol (38.93 g) and water (10.0 g). The obtained mixture is heated to 80° and stirred for another 30 minutes. After cooling to room temperature, the obtained ground solution is filled into airtight containers for storage.

Example 6b: Preparation of a Leucoindigo Dyeing Vat Using Synthetic Indigo with a Propylene Glycol/Water Mixture A solution of sodium hydroxide (1.18 g, 31.6 mmol) in propylene glycol (18.82 g) and fructose (4.81 g, 26.64 mmol) are sequentially added to the stirred suspension of synthetic indigo (3.5 g, 13.34 mmol) in propylene glycol (41.69 g) and water (30.0 g). The obtained mixture is heated to 80° C. and stirred for another 30 minutes. After cooling to room temperature, the obtained ground solution is filled into airtight containers for storage.

TABLE 4

Results - long term stability of examples 6a and 6b.

| Sample | T | t in weeks | L* | a* | b* | ΔE | Stability |
|---|---|---|---|---|---|---|---|
| Ref. | | | 81.27 | −0.59 | 12.94 | — | — |
| 6a | a.t. | 0 | 49.59 | −6.07 | −10.86 | — | — |
| | 40° C. | 12 | 52.57 | −5.73 | −11.03 | 3.00 | Stable |
| 6b | a.t. | 0 | 22.19 | −0.90 | −12.77 | — | — |
| | 40° C. | 12 | 27.27 | −2.74 | −12.96 | 5.10 | Stable |

Dyeing vats 6a and 6b achieve an intense deep blue color, showing that synthetic and natural indigo can be used as leucoindigo precursor. Moreover, the long-term stability of the leucoindigo vats is not affected by the presence of water.

Example 7a: Preparation of an Alkaline Lawsone-Based Composition in Water-Free Organic Solvents A 30% solution of sodium hydroxide in propylene glycol (10.35 mmol, 1.38 g) is added to a stirred solution of synthetic lawsone (0.5 g, 2.87 mmol) in propylene glycol (48.12 g) at room temperature. The solution is stirred for another 30 minutes before being filled into airtight containers for storage.

Further alkaline lawsone-based compositions based on isopentyldiol, ethylene glycol, dipropylene glycol, hexylene glycol and propylene glycol are prepared in an analogous manner.

Alternatively, an alkaline lawsone-based composition is obtained from powdered henna leaves by extracting the leaves (10.0 g, 1.45 wt.-% lawsone) with a 10% solution of sodium hydroxide in propylene glycol (12.0 g) at room temperature.

Example 7b: Preparation of an Alkaline Lawsone-Based Composition in an Organic Solvent/Water Mixture A 30% solution of sodium hydroxide in water (3.86 g) and synthetic lawsone (1.4 g, 8.04 mmol) are added sequentially to a stirred solution of propylene glycol (54.4 g) and water (40 g) at room temperature. The mixture is stirred for another 30 minutes. The resulting solution has a pH value of 12.2 and is filled into airtight containers for storage.

Similar alkaline lawsone-based compositions based on isopentyldiol, ethylene glycol, dipropylene glycol, hexylene glycol and propylene glycol are prepared in an analogous manner.

Alternatively, a similar alkaline lawsone-based composition is obtained from powdered henna leaves by extracting the leaves (10.0 g, 1.45 wt.-% lawsone) with a 30% solution of sodium hydroxide in Water (3.86 g) at room temperature.

Example 7c: Preparation of a pH-Neutral Lawsone-Based Composition in Water Free Organic Solvents Synthetic lawsone (1.0 g) is added to propylene glycol (99 g) and stirred at ambient conditions until complete dissolution. The obtained solution is filled into airtight containers for storage.

Similar pH-neutral lawsone-based compositions based on isopentyldiol, ethylene glycol, dipropylene glycol, hexylene glycol and propylene glycol are prepared in an analogous manner.

Alternatively, a similar water-free lawsone-based composition is obtained from powdered henna leaves by extracting the leaves (10.0 g, 1.45 wt.-% lawsone)

Example 8: Preparation of Exemplary Aqueous Compositions (Second Constituent)

TABLE 5

Exemplary aqueous compositions.

| Pos. | INCI/CTFA-name | 8a % (w/w) | 8b % (w/w) | 8c % (w/w) |
|---|---|---|---|---|
| 1 | Aqua (water) | 85.5 | 85.5 | 88.0 |
| 2a | Xanthan gum | 1.5 | — | — |
| 2b | Caesalpinia spinosa gum | — | 1.5 | — |
| 3 | Propylene glycol | 10.0 | 10.0 | 10.0 |
| 4 | Phenoxyethanol and ethylhexylglycerin [ | 1.0 | 1.0 | 1.0 |
| 5 | Benzyl alcohol | 1.0 | 1.0 | — |
| 6 | Citric acid | 1.0 | 1.0 | 1.0 |

Components 1 to 6 are mixed under stirring at 80° C. (8a, 8b) and room temperature (8c), respectively. After cooling, compositions with an aqueous (8c) or gel-like (8a, 8b) consistency are obtained. The measured pH-value for gels 8a and 8b is 2.5, whereas the pH value of solution 8c is 2.8.

Example 9: Preparation of a Leucoindigo Based Colorant Cream

TABLE 6

Ingredients - colorant cream.

| Pos. | INCI/CTFA-name | % (w/w) |
|---|---|---|
| 1 | Aqua (water) | 20.00 |
| 2 | Propylene glycol | 2.00 |
| 3 | Xanthan gum | 0.40 |
| 4 | Cetearyl alcohol (and) dicetyl phosphate (and) ceteth-10 phosphate [Crodafos CES] | 6.00 |
| 5 | Ceteareth-25 | 0.20 |
| 6 | Cetearyl alcohol | 6.00 |
| 7 | Lauryl alcohol | 3.00 |
| 8 | Myristyl alcohol | 1.00 |
| 9 | Pentaerythritol | 0.20 |
| 10 | Paraffinum Liquidum (Mineral Oil) | 1.00 |
| 11 | Aqua (Water) | 13.99 |
| 12 | Sodium hydroxide | 0.83 |
| 13 | Sodium Hydrosulfite | 0.30 |
| 14 | Propylene Glycol | 40.00 |
| 15 | Indigo | 2.50 |
| 16 | Fructose | 2.58 |

Compounds 1 to 3 are heated to 80° C. under stirring until a homogenous solution was obtained. Compounds 9 and 10 is added to a stirred mixture of compounds 4 to 8 at 80° C.

Subsequently, the mixture of compounds 4 to 10 is added to the solution comprising compounds 1 to 3 to form the cream-basis. The mixture of compounds 11 to 16 is heated to 80° C. and stirred for an additional 30 minutes at this temperature. The obtained yellowish-brown solution is added to the cream-basis comprising compounds 1 to 10 at 80° C. After cooling to room temperature, the cream is filled into airtight containers for storage.

Example 10: Optimization of the Coloration of Keratin Fibers

To determine the optimal coloration result, a serial dilution of composition 2a with an aqueous composition (pure water) with ratios ranging from 1:1 to 1:10 is prepared. The pH value of each dilution is adjusted to 4.3 by addition of citric acid. The results are summarized in table 6.

TABLE 7

Coloration results - serial dilution.

| Sample | ratio | pH | $L^*$ | $a^*$ | $b^*$ | $\Delta E$ |
|---|---|---|---|---|---|---|
| Ref. | — | — | 81.27 | −0.59 | 12.94 | — |
| 10a | 1:1 | 4.3 | 37.83 | −1.84 | −14.36 | 51.32 |
| 10b | 1:2 | 4.3 | 39.42 | −2.05 | −13.73 | 49.64 |
| 10c | 1:3 | 4.3 | 37.68 | −1.95 | −13.66 | 51.08 |
| 10d | 1:5 | 4.3 | 34.64 | −2.09 | −15.27 | 54.52 |

TABLE 7-continued

Coloration results - serial dilution.

| Sample | ratio | pH | $L^*$ | $a^*$ | $b^*$ | $\Delta E$ |
|---|---|---|---|---|---|---|
| 10e | 1:7 | 4.3 | 39.98 | −2.46 | −13.12 | 48.86 |
| 10f | 1:10 | 4.3 | 38.93 | −2.17 | −13.04 | 49.70 |

Taking the measuring tolerances on the uneven fiber surface into account the $b^*$-values remain approximately constant over the whole series. However, the $L^*$ value for dilution 10d with a coloring to aqueous composition ratio of 1:5 is considerably lower than the other $L^*$ values measured in the series, i.e. showing the most intense color (lowest lightness). In combination with the highest measured $b^*$ value, i.e. the highest proportion of blue, and consequently, largest color change $\Delta E$, the coloration resulting from dilution 10d is superior to the rest and therefore best suited for the further coloration processes.

Example 11: Coloration of Keratin Fibers with a Three-Constituent Mixture (Gel 8a)

The possible color shades of a three-constituent mixture are screened by varying the ration of the eucoindigo based composition 2a and the lawsone based composition 7a. The ratio of the colorant composition (mixture) to the aqueous composition 8a is kept at the optimized ratio of 1:5 (w/w). The results are summarized in table 7:

TABLE 8

Color shades - three-constituent mixture (gel 8a).

| Sample | 2a | 7a | pH | $L^*$ | $a^*$ | $b^*$ | $\Delta E$ | Shade |
|---|---|---|---|---|---|---|---|---|
| Ref. | | | — | 81.27 | −0.59 | 12.94 | — | beige |
| 11a | 0% | 100% | 3.3 | 63.24 | 25.63 | 44.13 | 44.55 | Henna-red |
| 11b | 20% | 80% | 3.4 | 52.94 | 4.77 | 17.34 | 23.74 | Reddish brown (fawn) |
| 11c | 80% | 20% | 4.1 | 41.18 | −3.84 | −6.80 | 44.80 | Reddish mid brown |
| 11d | 100% | 0% | 4.1 | 47.11 | −3.26 | −12.33 | 48.17 | Medium-dark jeans- blue |

Similar results are obtained, when using composition 8b instead of composition 8a as second constituent and/or different organic solvents for the leucoindigo based and/or lawsone-based colorant compositions, e.g., compositions 2b to 2e. Storing the individual constituents separately over a three-month period in a warming cabinet at 40° C. does not or hardly impair the coloration result of colorant mixtures prepared therewith.

Example 12: Coloration of Keratin Fibers with a Three-Constituent Mixture (Liquid 8c)

In analogy to example 11, the possible color shades are screened using the liquid composition 8c as aqueous component. The results are summarized in table 8:

TABLE 9

Color shades - three-constituent mixture (liquid 8c).

| Sample | 2a | 7a | pH | $L^*$ | $a^*$ | $b^*$ | $\Delta E$ | Shade |
|---|---|---|---|---|---|---|---|---|
| Ref. | | | — | 81.27 | −0.59 | 12.94 | — | beige |
| 12a | 0% | 100% | 3.2 | 57.35 | 29.57 | 54.94 | 56.97 | Henna-red |
| 12b | 10% | 90% | 3.2 | 40.32 | 4.77 | 26.88 | 43.59 | Reddish brown (fawn) |

TABLE 9-continued

Color shades - three-constituent mixture (liquid 8c).

| Sample | 2a | 7a | pH | L* | a* | b* | ΔE | Shade |
|---|---|---|---|---|---|---|---|---|
| 12c | 20% | 80% | 3.2 | 37.68 | 3.60 | 23.23 | 44.72 | Reddish mid brown |
| 12d | 30% | 70% | 3.2 | 33.63 | 2.72 | 19.20 | 48.17 | Slightly reddish mid brown |
| 12e | 40% | 60% | 3.2 | 34.27 | 6.61 | 25.12 | 49.08 | Mid brown |
| 12f | 50% | 50% | 3.2 | 34.87 | 0.86 | 16.26 | 46.54 | Dark brown |
| 12g | 60% | 40% | 3.2 | 32.44 | −1.86 | 10.02 | 48.94 | Dark ashen brown |
| 12h | 70% | 30% | 3.2 | 35.52 | −2.89 | −0.47 | 47.73 | Black brown ashen |
| 12i | 80% | 20% | 3.3 | 35.60 | −2.71 | −2.10 | 48.13 | Black brown ashen |
| 12j | 100% | 0% | 3.3 | 33.26 | −1.61 | −12.49 | 54.34 | Intense dark blue |

Similar results are obtained when using different organic solvents for the leucoindigo based and/or lawsone-based colorant compositions, e.g., compositions 2b to 2e. The comparison to the shades obtained in examples 11 and 12 shows, that that either with gel-like or with liquid consistency, a full range of color starting from henna red up to indigo blue has been achieved.

Storing the individual constituents separately over a three-month period in a warming cabinet at 40° C. does not or hardly impair the coloration result of colorant mixtures prepared therewith.

Example 13: Coloration of Keratin Fibers with a Three-Constituent Mixture Comprising Composition 6b (Gel 8a)

The obtainable color shades for leucoindigo colorant compositions comprising a water/organic solvent mixture are screened in analogy to example 11. The results are summarized in table 10.

TABLE 10

Color shades - three-constituent mixture (gel 8a).

| Sample | 6a | 7a | pH | L* | a* | b* | ΔE | Shade |
|---|---|---|---|---|---|---|---|---|
| Ref. | — | — | — | 81.27 | −0.59 | 12.94 | — | beige |
| 13a | 0% | 100% | 3.3 | 54.36 | 25.67 | 47.47 | 51.04 | Henna-red |
| 13b | 30% | 70% | 3.4 | 46.87 | 17.34 | 36.67 | 45.47 | Slightly brownish henna-red |
| 13c | 50% | 50% | 3.6 | 43.35 | 16.28 | 33.15 | 46.16 | Brownish henna-red |
| 13d | 60% | 40% | 3.8 | 46.69 | 7.29 | 22.99 | 36.86 | Red brown |
| 13e | 70% | 30% | 4.1 | 44.05 | 9.53 | 24.86 | 40.37 | Dark red brown |
| 13f | 80% | 20% | 4.1 | 46.20 | 5.95 | 20.36 | 36.46 | Brown |
| 13g | 90% | 10% | 4.1 | 40.63 | 0.34 | 8.37 | 40.96 | Ashen brown |
| 13j | 100% | 0% | 4.1 | 41.80 | −4.19 | −9.73 | 45.66 | Intense dark blue |

Similar results are obtained, when using composition 8b instead of composition 8a as second constituent and/or different organic solvents for the leucoindigo based and/or lawsone-based colorant compositions.

Storing the individual constituents separately over a three-month period in a warming cabinet at 40° C. does not or hardly all impair the coloration result of colorant mixtures prepared therewith.

Example 14: Coloration of Keratin Fibers with Leucoindigo Colorant Cream 9

The leucoindigo colorant cream 9 is mixed with different aqueous compositions in a ratio of 1:5. The obtained mixture is applied to yak hair (6 g of mixture per gram yak hair). Prior to the CIELAB measurement, the hair is rinsed and dried after the application time of 15 minutes. The results are summarized in table 11.

TABLE 11

Color shades - colorant cream.

| Sample | Aq. comp. | pH | L* | a* | b* | ΔE | Shade |
|---|---|---|---|---|---|---|---|
| Ref. | — | — | 81.27 | −0.59 | 12.94 | — | beige |
| 14a | Propylene glycol/water 1:1 | 4.3 | 54.36 | 25.67 | 47.47 | 51.04 | Light jeansblue |
| 14b | Water | 4.3 | 46.87 | 17.34 | 36.67 | 45.47 | Light jeansblue |
| 14c | Gel 8a | 4.2 | 43.35 | 16.28 | 33.15 | 46.16 | Light jeansblue |

The obtained blue shades are similar for all samples. Thus, it could be shown, that uniform coloring results are also reliably achieved for colorant creams with different aqueous compositions and organic solvent to water ratios. Similar results are obtained with colorants based on other organic solvents.

Example 15: Coloration of Fabrics with an Alkaline Leucoindigo Colorant

The coloration is tested on SDCE Multifibre DW from SDC Enterprises Ltd, GB. The fabric strips contain different textile materials for performing color fastness tests according to ISO 105, group C and group E.

Leucoindigo composition 2a is diluted with water as aqueous constituent in a 1:5 ratio. The pH value of the resulting dyeing solution is 10.9. For the coloration, 10 g of the test fabric (SDCE Multifibre DW) is treated with 250 g of the dyeing solution for 30 minutes, followed by rinsing with water and drying. The results for the individual fibers/fabrics at different temperatures are summarized in table 12.

TABLE 12

Results - alkaline coloration of textiles.

| Sample | L* | a* | b* | ΔE | Shade |
|---|---|---|---|---|---|
| Wool | | | | | |
| ref. | 89.06 | −2.69 | 9.62 | — | Beige |
| dyed at 20° C. | 33.06 | 0.23 | −13.40 | 60.62 | Mid jeansblue |
| dyed at 70° C. | 26.42 | 1.66 | −12.03 | 66.42 | Black blue |
| Polyacryl Orion 75 | | | | | |
| ref. | 92.26 | −2.29 | 2.19 | — | White |
| dyed at 20° C. | 59.08 | −1.66 | −9.68 | 35.24 | Light greyish blue |
| dyed at 70° C. | 46.47 | −0.15 | −8.99 | 47.18 | Mid greyish blue |
| Polyester Dacon 54 | | | | | |
| ref. | 90.88 | −1.50 | 0.56 | — | White |
| dyed at 20° C. | 48.69 | −0.72 | −12.89 | 44.29 | Ashen jeansblue |
| dyed at 70° C. | 30.72 | 1.95 | −13.66 | 61.91 | Dark ashen jeansblue |
| Polyamid Nylon 6.6 | | | | | |
| ref. | 92.14 | −2.19 | 1.68 | — | White |
| dyed at 20° C. | 42.04 | −0.27 | −15.55 | 53.01 | Jeansblue |
| dyed at 70° C. | 27.47 | 1.58 | −18.05 | 67.72 | Intense jeansblue |
| Cotton | | | | | |
| ref. | 91.42 | −2.00 | 5.61 | — | Beige |
| dyed at 20° C. | 19.54 | 3.88 | −14.71 | 74.93 | Very dark jeansblue |
| dyed at 70° C. | 28.45 | 1.69 | −13.16 | 65.81 | Dark jeansblue |
| Celluoseacetate | | | | | |
| ref. | 92.05 | −3.06 | 5.87 | — | Beige |
| dyed at 20° C. | 42.53 | −1.55 | −16.19 | 54.23 | Very light jeansblue |
| dyed at 70° C. | 31.71 | 1.99 | −16.13 | 64.42 | Light jeansblue |

The obtained shade varies with the respective fiber/fabric. As expected, a higher dyeing temperature results in a color intensification for all samples. Similar results are obtained with colorants based on other organic solvents.

Example 16: Coloration of Fabrics with an Acidic Leucoindigo Colorant

The coloration is tested on SDCE Multifibre DW from SDC Enterprises Ltd, GB. The fabric strips contain different textile materials for performing color fastness tests according to ISO 105, group C and group E.

leucoindigo composition 2a is diluted with the liquid aqueous composition 8c in different ratios (see column "sample/ratio" in table 12). The pH value of the resulting dyeing solutions is 3.0. The fabrics are immersed in the dyeing solutions at 85° C. for 15 minutes in the respective liquor ratios (column "l.r."), i.e., the ratio of grams fabric to grams dyeing solution, as indicated below. The fabric samples are subsequently rinsed with water and dried prior to measuring their color.

TABLE 13

Results - acidic coloration of textiles.

| Sample/ratio | l.r. | L* | a* | b* | ΔE | Shade |
|---|---|---|---|---|---|---|
| Wool | | | | | | |
| ref. | — | 89.06 | −2.69 | 9.62 | — | Beige |
| 1:10 | 1:25 | 34.43 | 3.54 | −19.49 | 62.21 | Dark jeansblue |
| 1:10 | 1:10 | 26.58 | 0.96 | −10.53 | 65.75 | Dark jeansblue |
| 1:50 | 1:25 | 22.33 | 0.85 | −7.17 | 68.90 | Dark jeansblue |
| 1:200 | 1:25 | 39.83 | −3.08 | 1.20 | 49.94 | Bluegreen |
| Polyacryl Orion 75 | | | | | | |
| ref. | — | 92.26 | −2.29 | 2.19 | — | White |
| 1:10 | 1:25 | 34.12 | 4.83 | −21.24 | 63.08 | Vibrant blue |
| 1:10 | 1:10 | 46.01 | −0.78 | −16.49 | 49.90 | Steelblue |
| 1:50 | 1:25 | 35.63 | 0.69 | −22.45 | 61.82 | Vibrant blue |
| 1:200 | 1:25 | 62.02 | −3.80 | −6.71 | 31.56 | Very light jeansblue |
| Polyester Dacon 54 | | | | | | |
| ref. | — | 90.88 | −1.50 | 0.56 | — | White |
| 1:10 | 1:25 | 42.03 | −0.18 | −12.85 | 50.67 | Steelblue |
| 1:10 | 1:10 | 45.60 | −1.84 | −14.40 | 47.68 | Steelblue |
| 1:50 | 1:25 | 53.42 | −2.65 | −13.09 | 39.88 | Steelblue |
| 1:200 | 1:25 | 63.18 | −2.18 | −4.37 | 28.14 | Light greyblue |
| Polyamid Nylon 6.6 | | | | | | |
| ref. | — | 92.14 | −2.19 | 1.68 | — | White |
| 1:10 | 1:25 | 16.31 | 4.79 | −2.50 | 76.26 | Very dark black blue |
| 1:10 | 1:10 | 17.30 | 4.96 | −7.32 | 75.72 | Very dark black blue |
| 1:50 | 1:25 | 16.11 | 3.64 | −3.28 | 76.42 | Very dark black blue |
| 1:200 | 1:25 | 21.14 | −0.54 | −15.69 | 73.11 | Mid jeansblue |
| Cotton | | | | | | |
| ref. | — | 91.42 | −2.00 | 5.61 | — | Beige |
| 1:10 | 1:25 | 35.43 | 0.03 | −12.89 | 59.00 | Ashen jeansblue |
| 1:10 | 1:10 | 34.02 | 0.12 | −12.89 | 60.34 | Ashen jeansblue |
| 1:50 | 1:25 | 41.20 | −1.75 | −11.98 | 53.21 | Ashen jeansblue |
| 1:200 | 1:25 | 53.59 | −1.97 | −7.06 | 39.89 | Light greyblue |
| Celluoseacetate | | | | | | |
| ref. | — | 92.05 | −3.06 | 5.87 | — | Beige |
| 1:10 | 1:25 | 25.55 | 1.85 | −8.36 | 68.18 | Very dark jeansblue |
| 1:10 | 1:10 | 20.15 | 5.54 | −12.93 | 74.81 | Very dark jeansblue |
| 1:50 | 1:25 | 20.04 | 3.02 | −8.43 | 73.66 | Very dark jeansblue |
| 1:200 | 1:25 | 37.46 | −1.05 | −17.23 | 59.31 | Steelblue |

Similar to the alkaline dyeing solutions of example 15, different shades are obtained for different fabrics. Surprisingly, even a high dilution ratio of 1:200 leads to a clearly visible coloration of the individual fabrics, proofing the exceptional dyeing capacity of the inventive colorant. Similar results are obtained with colorants based on other organic solvents.

Example 17: Coloration of Silk with Acidic or Alkaline Leucoindigo Colorants The leucoindigo colorant composition 2a is diluted with pure water as aqueous constituent in a ratio of 1:5 and applied to the silk. The pH value of the colorant solution is 10.9.

The acidic leucoindigo colorant solution is prepared in the same manner, however, the pH value was adjusted to 3.0 with citric acid.

The coloration process is carried out by immersing the silk in the colorant solution at a ratio of 1 g fabric per 100 g solution at 60° C. for 30 minutes] The silk samples are subsequently rinsed and dried prior to measuring their CIELAB values.

TABLE 14

Results - acidic coloration of textiles.

| Sample/ratio | l.r. | L* | a* | b* | ΔE | Shade |
|---|---|---|---|---|---|---|
| silk ref. | — | 94.02 | −1.65 | 1.71 | — | White |
| alkaline | 1:100 | 32.65 | −0.68 | −13.94 | 63.34 | Light jeansblue |
| acidic | 1:100 | 26.81 | −1.77 | −7.62 | 67.85 | Black blue |

The obtained CIELAB values show, that a coloration under acidic conditions yields superior results in terms of color intensity. Moreover, the obtained coloration is more uniform at low pH. Similar results are obtained with colorants based on other organic solvents.

This observation is consistent with the hypothesis that coloration results is impaired due to repulsive electrostatic forces between leucoindigo and the respective substrate fibers at high pH values.

The invention claimed is:

1. A composition for coloring fibers and fabrics comprising leucoindigo, at least one organic solvent, wherein the water content of the composition is less or equal to 60 wt.-%, of the total weight of the composition, characterized in the composition further comprises at least one strong base, wherein the at least one strong base is an alkali metal hydroxide, an alkaline earth metal hydroxide or a mixture thereof, that the at least one organic solvent is selected from a first group of solvents consisting of ethylene glycol, propylene glycol, isopentyldiol, dipropylene glycol and mixtures thereof and that the composition comprises at least one reducing agent.

2. The composition of claim 1, wherein the at least one base is in the range of between 0.01 and 20 wt.-% of the total weight of the composition.

3. The composition of claim 1, wherein the composition comprises a second group of solvents, which is selected from solvents that are fully miscible with the first group of solvents and at least partially miscible with water.

4. The composition of claim 3, wherein the second group solvent is selected from ethanol, propanol, 1,3-propanediol, glycerin, butylene glycol, hexylene glycol, dimethyl isosorbide, acetamide MEA, ethoxydiglycol or mixtures thereof and/or that the total mass ratio of first to second group solvents is in the range of between 1:10 and 10:1.

5. Composition of claim 1, wherein the water content of the composition is below 1 wt.-%, of the total weight of the composition and/or that the leucoindigo is in the range of between 0.1 and 30 wt.-% of the total weight of the composition.

6. Composition of claim 1, wherein the at least one reducing agent is in the range of between 0.1 and 20 wt.-% of the total weight of the composition.

7. Composition of claim 1, wherein the reducing agent is ascorbic acid, erythorbic acid, hydroxyacetone, sodium dithionite, sodium sulfite, sodium metabisulfite, sodium borohydride, sodium thiosulfate, a reducing sugar or a mixture thereof.

8. A method for obtaining a composition as according to claim 1, characterized by the steps of:

a) addition of at least one base and at least one reducing agent to a suspension of indigo in at least one organic solvent and b) heating the suspension of indigo until the vatting is complete.

9. The method of claim 8, wherein the at least one base is added as an aqueous solution in step a) and/or that water is added to suspension of step a) and/or that the mixture is heated in step b) to temperatures in the range of between 50 and 110° C.

10. A colorant mixture for coloring fibers and fabrics comprising a composition of 1 as first constituent and at least one further composition as a second constituent, characterized in that the second constituent is an aqueous composition.

11. The mixture of claim 10, wherein the second constituent comprises at least one organic acid, inorganic acid and/or buffer and/or that the water content of the second constituent is at least 50 wt.-% of the second constituent and/or that the mass ratio of first constituent to the second constituent in the range of between 1:2 to 1:8.

12. The mixture of claim 11, wherein the concentration of the least one organic acid, inorganic acid and/or buffer ranges is in the range of between 0.1 to 25 wt.-% of the total weight of the second constituent.

13. The mixture according to claim 12, wherein the least one organic acid is selected from citric acid, formic acid, acetic acid, tartaric acid, adipic acid, succinic acid, malic acid, maleic acid, fumaric acid, an alpha-hydroxy acid or mixtures thereof, the at least one inorganic acid is selected from phosphoric acid, phosphorous acid, hydrochloric acid, sulfuric acid, sulfurous acid or mixtures thereof and/or the at least one buffer is selected from acetate buffer, phosphate buffer, phosphate-citrate buffer, citrate buffer, tris(hydroxymethyl)aminomethane (TRIS) buffer, glycine buffer, tris(hydroxymethyl)aminomethane-glycine (TRIS-glycine) buffer and/or bicarbonate buffer and/or that the mixture's pH value is in the range of between 2.0 and 12.5.

14. The mixture of claim 10, wherein the mixture comprises a third constituent, wherein the third constituent comprises at least one further colorant compound.

15. The mixture of claim 14, wherein the at least one further colorant compound is selected from lawsone, campeche wood extract, redwood extract, myrobalan plum extract, quercetin and/or 3,4,5-trihydroxybenzoic acid and/or that the organic solvent or solvent mixture and/or the water content of the third constituent is/are the same as that of the first constituent and/or that the mass ratio of first constituent to third constituent is in the range of between 20:1 and 1:20 and/or that the mass ratio of the total amount of the first and third constituent to the second constituent is in the range of between 1:2 and 1:8.

16. A method for coloring fibers and fabrics comprising an application of the composition of claim 1 to for coloring fibers and fabrics, wherein the fibers are natural or artificial fibers selected from a group consisting of protein-, cellulose- or petrochemical-based fibers, and the fabrics are selected from the group consisting of keratin fibers, kapok, hemp, bamboo, flax, cotton, sisal, jute, kenaf, ramie, lyocell, soy or coconut, nylon, polyester, acrylic, spandex, olefin, synthetic fur, leather, neoprene, microfiber, acetate, silk, wool, or feathers.

17. A kit consisting of at least two constituents, wherein a first constituent comprises leucoindigo of claim 1 and a second constituent has a pH lower than the first constituent.

18. A method for coloring fibers and fabrics comprising an application of the composition of claim 10 to fibers and fabrics, wherein the fibers are natural or artificial fibers selected from a group consisting of protein-, cellulose- or petrochemical-based fibers, and the fabrics are selected from a group consisting of keratin fibers, kapok, hemp, bamboo, flax, cotton, sisal, jute, kenaf, ramie, lyocell, soy or coconut, nylon, polyester, acrylic, spandex, olefin, synthetic fur, neoprene, microfiber, acetate, silk, wool, leather, or feathers.

19. The composition of claim 1, wherein the water content of the composition is less or equal to 50 wt.-% of the total weight of the composition.

* * * * *